(12) United States Patent
Schoch et al.

(10) Patent No.: US 6,996,644 B2
(45) Date of Patent: Feb. 7, 2006

(54) APPARATUS AND METHODS FOR INITIALIZING INTEGRATED CIRCUIT ADDRESSES

(75) Inventors: Daniel Schoch, Costa Mesa, CA (US); Wim F Cops, Newport Beach, CA (US); Naser Adas, Costa Mesa, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 330 days.

(21) Appl. No.: 09/876,301

(22) Filed: Jun. 6, 2001

(65) Prior Publication Data

US 2002/0188781 A1    Dec. 12, 2002

(51) Int. Cl.
*G06F 13/00* (2006.01)
(52) U.S. Cl. .................. 710/107; 710/36; 710/305
(58) Field of Classification Search ............. 710/107, 710/100, 305, 306, 36, 5
See application file for complete search history.

(56) References Cited

U.S. PATENT DOCUMENTS

| | | | |
|---|---|---|---|
| 5,327,394 A * | 7/1994 | Green et al. ............. 365/233.5 |
| 5,923,597 A * | 7/1999 | Tweed et al. ................ 365/194 |
| 6,070,003 A * | 5/2000 | Gove et al. .................. 710/317 |
| 6,334,159 B1 * | 12/2001 | Haupt ............................ 710/6 |
| 6,487,617 B1 * | 11/2002 | Gates ........................ 710/100 |
| 6,529,979 B1 * | 3/2003 | Floyd et al. ................ 710/105 |
| 6,629,161 B2 * | 9/2003 | Matsuki et al. ............... 710/22 |
| 6,725,314 B1 * | 4/2004 | Dong ......................... 710/305 |
| 2002/0147877 A1 * | 10/2002 | Farmwald et al. .......... 710/305 |
| 2003/0023908 A1 * | 1/2003 | Massie ........................ 714/700 |
| 2003/0120895 A1 * | 6/2003 | Litaize et al. ................. 712/11 |
| 2004/0093450 A1 * | 5/2004 | Andreas ..................... 710/110 |

\* cited by examiner

*Primary Examiner*—Rehana Perveen
*Assistant Examiner*—Kim T. Huynh
(74) *Attorney, Agent, or Firm*—Foley & Lardner LLP

(57) ABSTRACT

Multiple ICs communicate with a controller through a shared bus. The ICs are also joined to an output of the controller in a daisy chain configuration. Each IC includes an input for receiving a signal on a link of the daisy chain and an output for providing a signal on a link of the daisy chain. The daisy chain links are used for address initialization. Thus only one controller pin and two IC pins are required for address initialization. The daisy chain links may be used for distributing address data, or may be used for distributing an enable signal that allows an IC to store address data provided on the shared bus.

29 Claims, 3 Drawing Sheets

Timing Diagram

APPARATUS AND METHODS FOR INITIALIZING INTEGRATED CIRCUIT ADDRESSES

BACKGROUND OF THE INVENTION

1. Technical Field

The invention pertains to communication among a controller and integrated circuits, and in particular embodiments, to initializing integrated circuit addresses.

2. Related Art

Microelectronic devices may include multiple integrated circuits (ICs) that operate in conjunction with a controller. In such devices, it is necessary to provide a manner of communicating data between the controller and the ICs. In the interests of miniaturization, it is typically undesirable to use separate dedicated communication lines between each IC and the controller. As a result, a shared bus approach is preferred for most applications.

An example of a conventional shared bus system is illustrated in FIG. 1. The system includes a controller 10 and several integrated circuits (ICs) 12, 14, 16. The integrated circuits may be any of a variety of well known types of ICs including application specific integrated circuits (ASICs), digital signal processors (DSPs), mixed signal processors, and microprocessors. Although three ICs are shown in FIG. 1, the number will vary depending on the application.

The controller communicates data to and from the ICs through a shared bus 18. In order to distinguish communications on the shared bus, each IC is assigned a unique address. The address of each IC is initialized during system initialization. In the system shown in FIG. 1, a four bit address is communicated to each IC in the form of single bits provided on individual dedicated address lines 20. However, as seen in FIG. 1, the system requires separate address lines for each IC, and each address line occupies a separate pin of the controller and of an IC. This arrangement is undesirable because pins are scarce in miniaturized circuits, and the pins used for the address lines in the conventional system are typically not used for any further purpose. Consider that, for example, if it is desired to use sixteen ICs, a total of 64 individual address lines would be required, occupying 64 pins of the controller and four pins of each IC. This eliminates valuable resources at both the controller and the ICs, and may limit the number of ICs that can be used in a given system to a number that is less than would otherwise be desired.

In an alternative to the system of FIG. 1, addresses may be preassigned to each IC by tying address pins of each IC to high or low levels. While this eliminates the need to occupy pins on the controller, it still occupies a large number of pins on each IC, and it complicates the manufacturing process by requiring manual address configuration during manufacturing, since the ability to configure IC addresses during operation is eliminated.

SUMMARY

Embodiments of the invention provide systems that optimize the number of pins required to assign addresses to ICs in a multiple IC shared bus system. Further embodiments of the invention provide processes within multiple IC shared bus systems that assign addresses to ICs in a manner that minimizes the number of pins required.

In accordance with an embodiment of the invention, a system includes a controller and multiple ICs. The ICs communicate with the controller over a shared bus. The ICs are further joined to an output of the controller in a daisy chain configuration. In accordance with one embodiment of the invention, the controller produces address data that is sent to a first IC through the daisy chain connection. The IC stores the address in its address register and provides incremented address data to the next IC in the daisy chain. In accordance with another embodiment of the invention, the controller produces an enable signal that is sent to a first IC through a daisy chain link. At the same time, address data for the first IC is provided on the shared bus. In response to the enable signal, the IC stores the address on the shared bus in its address register. The enable signal is thereafter propagated to successive ICs over daisy chain links in conjunction with successive addresses provided on the shared bus.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
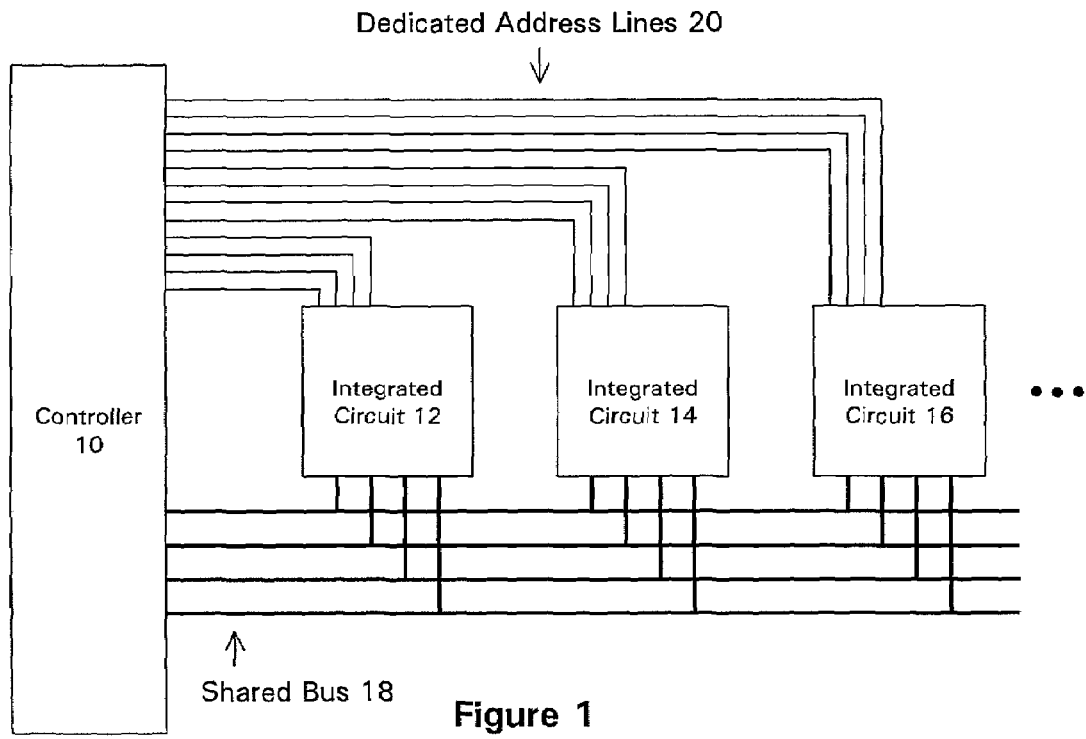
FIG. 1 is an illustration of a conventional multiple IC shared bus system.
Figure 2:
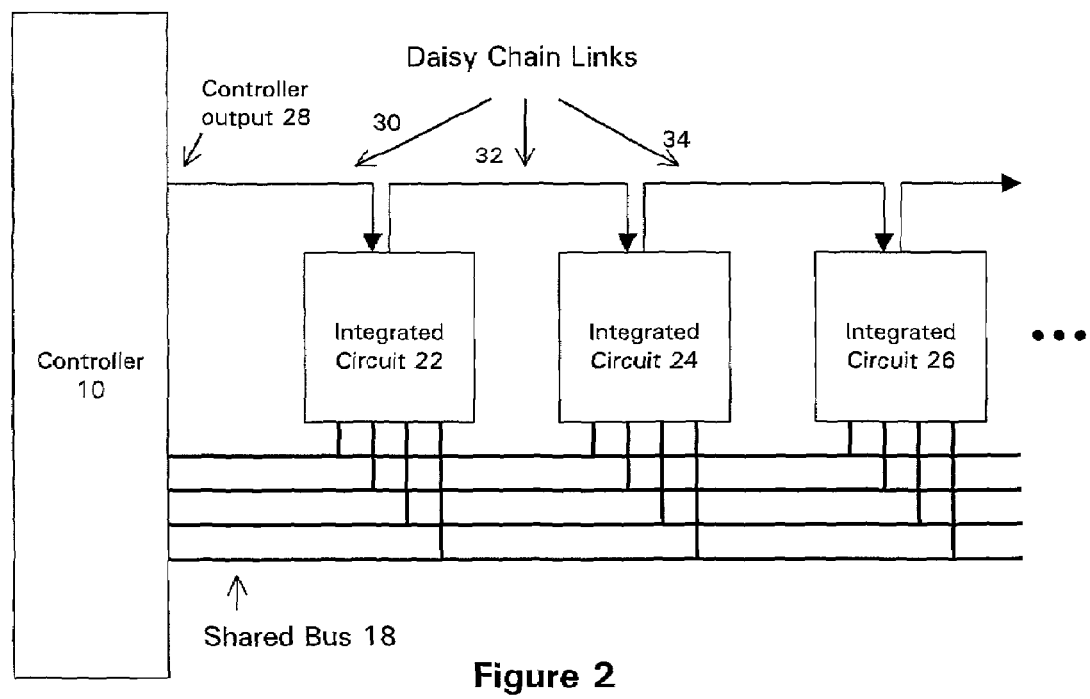
FIG. 2 is an illustration of a multiple IC shared bus system in accordance with an embodiment of the invention.

A system in accordance with an embodiment of the invention is illustrated in FIG. 2. In the system of FIG. 2, multiple ICs 22, 24, 26 communicate with a controller 10 through a shared bus 18. The ICs are also joined to an output 28 of the controller in a daisy chain configuration by daisy chain links 30, 32, 34. Each IC includes an input for receiving a signal on a link of the daisy chain and an output for providing a signal on a link of the daisy chain. The daisy chain links are used for address initialization. Thus only one controller pin and two IC pins are used for address initialization.

Figure 3:
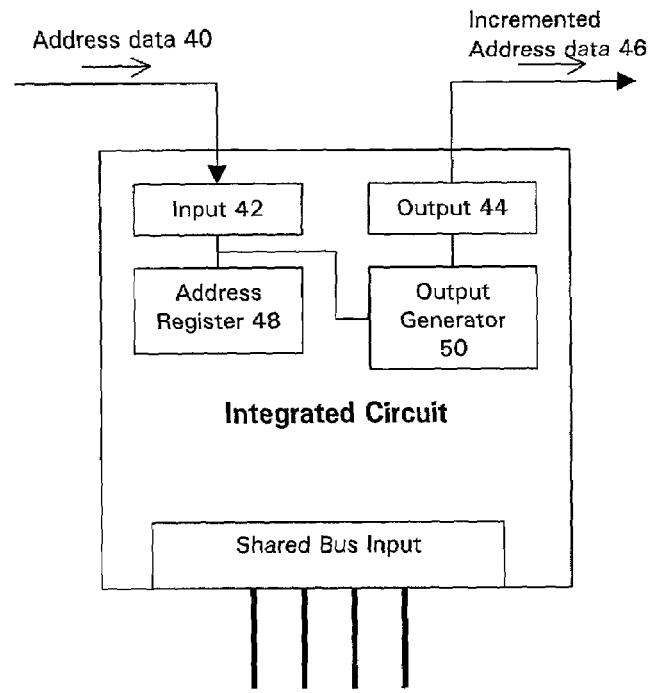
FIG. 3 is an illustration of an IC in accordance with a first embodiment of the invention.

The ICs of a system in accordance with FIG. 2 may be structured in various manners to utilize the daisy chain configuration for address initialization. FIG. 3 shows one embodiment of an integrated circuit that may be employed in a system as illustrated in FIG. 2. In accordance with this embodiment, the daisy chain link is used for conveying address data 40 to the ICs. Each IC includes an input 42 for receiving address data 40 and an output 44 for providing incremented address data 46. Each IC further includes an address register 48 where received address data is stored, and output generator logic 50 that increments the stored address. In accordance with this embodiment, a storage medium (not shown) in communication with a controller 10 as shown in FIG. 2 stores programming instructions for instructing the controller 10 to produce first address data on the controller output 28. The storage medium is preferably, but not limited to, a nonvolatile memory device such as a ROM or flash memory.

Figure 4:
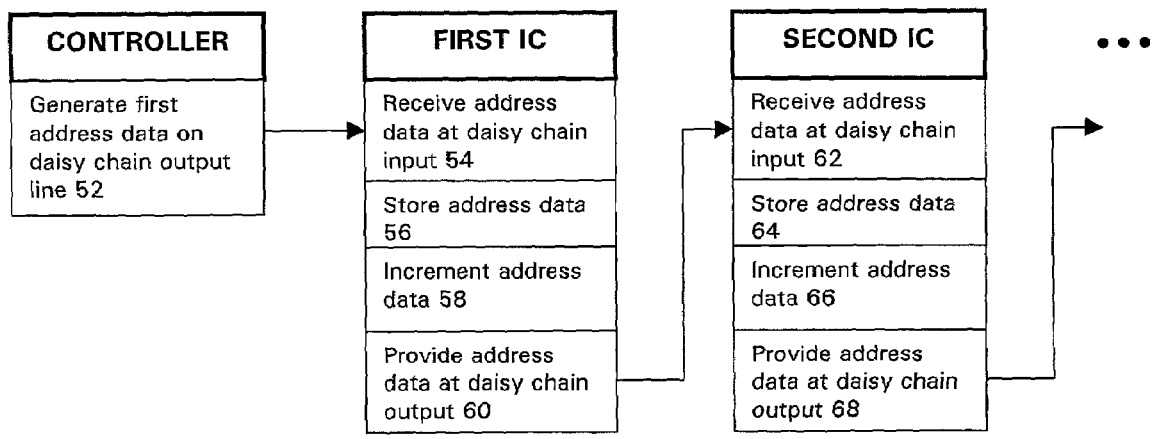
FIG. 4 is an illustration of a process in accordance with the embodiment of FIG. 3.

FIG. 4 illustrates an address initialization process performed in a system as illustrated in FIG. 2 and using ICs as illustrated in FIG. 3. In this process, the controller initially generates first address data on an output line that is connected to the input of a first IC (52). The address data represents the address of the first IC. The address data may take a variety of forms, for example, a series of pulses equal in number to the value of the address, or a serially transmitted multi-bit binary address word. The address data is received at the input of the IC (54) and is stored in the address register (56). The address data is also provided to the output generator logic, which increments the stored address value (58) and provides the incremented address data to the output (60). The output port drives a link in the daisy chain connecting the first IC to the second IC in the daisy chain. The second IC in turn receives the address data (62), stores that address in its address register (64), further increments the stored address (66), and provides the incremented address at the daisy chain output from which it is conveyed to a next consecutive IC (68). Thus, upon generating an address of an initial IC at the controller, a series of consecutive addresses is automatically propagated down the chain of ICs in a cascading fashion without further intervention from the controller.

The logic within the IC for processing the input address data signal and generating the output data will vary with the type of address data signal employed. For example, if the address data is represented by a series of pulses, a counter may be employed to sum the pulses to provide a binary address for storage in the address register. Further logic circuitry may be employed, for example, to decrement the counter sum by one to enable storage of a zero address in response to receipt of a single pulse as address data. The output generator may then increment the value stored in the register by two and produce a corresponding number of pulses.

Alternatively, if the address data is provided in the form of a binary word, the address register may simply store the received binary word, and the output generator logic may increment the binary word and provide the incremented binary word as output.

Those having ordinary skill in the art of microelectronics are capable of designing a variety of logic circuits that may be employed for the aforementioned purposes.

In further embodiments, an IC as shown in FIG. 3 may comprise a processor with associated memory storing programming instructions for performing the functions of the logic circuits previously described with respect to FIG. 3. Thus, the IC may be programmed to receive address data at a daisy chain input, store the address data as the address of the IC in an address register, increment the address data, and provide the incremented address data at a daisy chain output.

Figure 5:
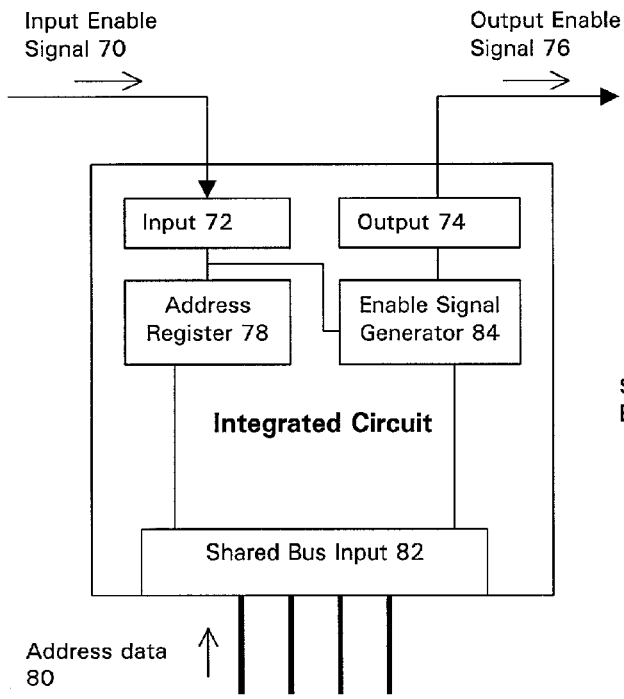
FIG. 5 is an illustration of an IC and corresponding timing diagram in accordance with a second embodiment of the invention.

FIG. 5 shows an alternative embodiment of an integrated circuit that may be employed in the system illustrated in FIG. 2. In accordance with this embodiment, the shared bus is used for distributing address data to the ICs, and the daisy chain link is used for distributing an enable signal that enables an IC to store an address present on the shared bus. Each IC includes an input 72 for receiving an input enable signal 70 and an output 74 for providing an output enable signal 76. Each IC also includes an address register 78 where address data 80 received on the shared bus through a shared bus input 82 is stored. Each IC further includes enable signal generator logic 84 that generates an enable signal at the output in conjunction with a change in the address data present on the shared bus. Preferred timing of the output enable signal 76 relative to the address data on the shared bus is shown in the timing diagram of FIG. 5. In the daisy chain configuration, the output signal shown in the timing diagram will typically constitute the input signal received by a succeeding IC. Thus, in the embodiment of FIG. 5, the ICs are successively enabled to store an address at each change of the address data on the shared bus.

Further in accordance with this embodiment, the controller is programmed to produce a series of addresses on the shared bus and to produce an enable signal on an output in conjunction with a first address of the series of addresses. Programming instructions for causing the controller to produce these signals may be stored in a storage medium (not shown) in communication with the controller. The storage medium is preferably, but not limited to, a non-volatile memory device such as a ROM or flash memory.

Figure 6:
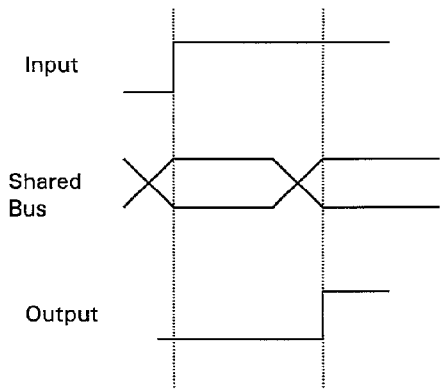
FIG. 6 is an illustration of a process in accordance with the embodiment of FIG. 5.
Figure 6:
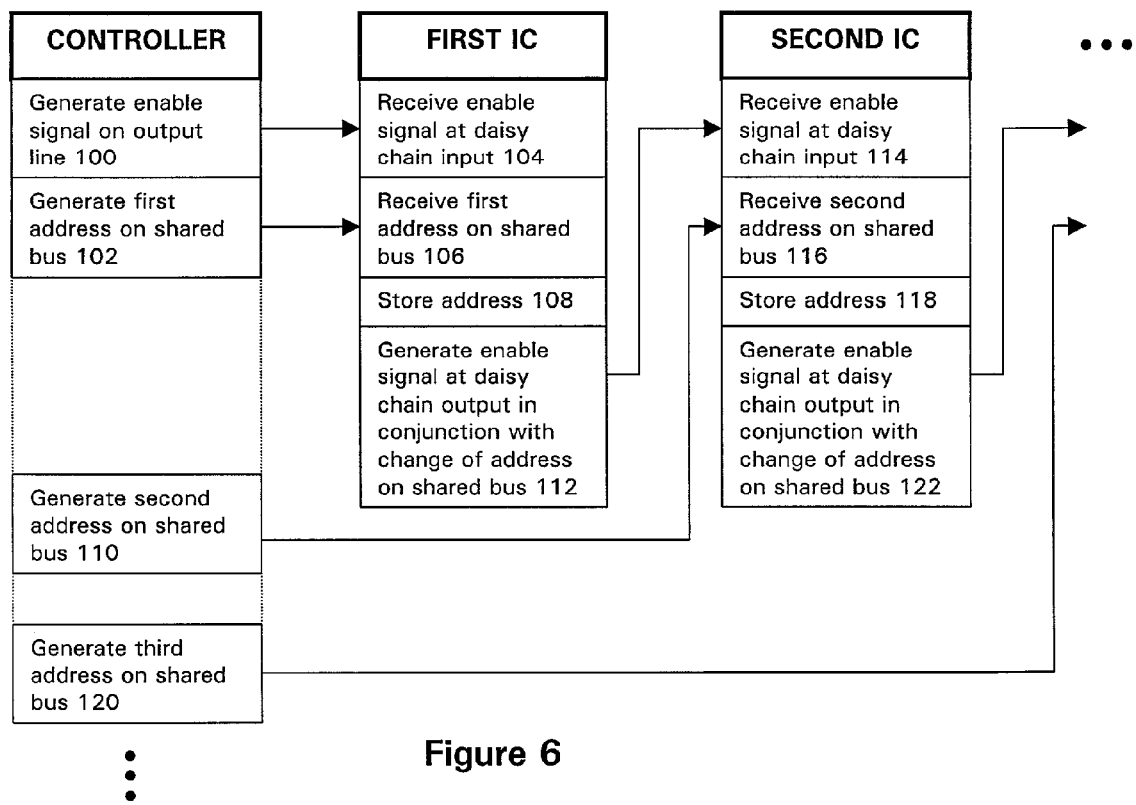

FIG. 6 illustrates an address initialization process performed in a system as illustrated in FIG. 2 and using ICs as illustrated in FIG. 5. Initially, the controller generates an enable signal on its daisy chain output (100), and generates a first address on the shared bus (102). Although FIG. 6 shows the enable signal being generated prior to the first address signal, the order of these two signals is immaterial so long as they coincide. The enable signal is received by a first IC on its daisy chain input (104), and the address data is received by the first IC on the shared bus (106). Upon coincidence of the enable signal and the address data, the first IC stores the address in its address register (108).

The controller thereafter generates a second address on the shared bus (110), and the first IC generates an enable signal at its daisy chain output in conjunction with the change of address data on the shared bus (112). The enable signal is received by a second IC on its daisy chain input (114), and the address data is received by the second IC on the shared bus (116). Since the enable signal is present, the second IC stores the address in its address register (118). The controller thereafter generates a third address on the shared bus (120), and the second IC generates an enable signal at its daisy chain output in conjunction with the change of address data on the shared bus (122). In this manner, the enable signal is propagated to each successive IC in conjunction with the changes of address on the shared bus, allowing each IC to store a consecutive one of the addresses in its address register.

The enable signal generator logic 84 of the ICs may be implemented in a variety of manners. In one embodiment, the enable signal generator logic 84 may comprise a timer that is initialized upon receipt of the enable signal 70, and that generates an enable signal 76 after a period of time that coincides with the rate at which address data is changed on the shared bus. In a preferred embodiment, the enable signal generator logic 84 receives the input signal 70 and shared bus signals as inputs, and produces an output enable signal 76 upon detecting the first change in address data after receiving the input enable signal 70. In this manner, enable signals are not propagated until new address data for the next consecutive IC is available on the shared bus. Thus the enable signals are synchronized with the data rate on the shared bus, eliminating timing problems that could occur in a timer based implementation.

Those having ordinary skill in the art of microelectronics are capable of designing a variety of logic circuits that may be employed for the aforementioned purposes.

In further embodiments, an IC as shown in FIG. 5 may comprise a processor with associated memory storing programming instructions for performing the functions of the logic circuits previously described with respect to FIG. 5. Thus, the IC may be programmed to initialize a timer upon receipt of an enable signal, and generate an enable signal upon expiration of the timer. Alternatively, the IC may be programmed to receive an enable signal at a daisy chain input, store address data present on the shared bus as the address of the IC in response to the enable signal, detect a change in the address data on the shared bus, and generate an enable signal at a daisy chain output.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. An electronic device, comprising:
    a controller programmed to produce first address data on an output thereof;
    a plurality of integrated circuits (ICs) addressable by the controller; and
    a shared bus, said shared bus joining the controller and the plurality of ICs such that the controller is able to send data to the plurality of ICs over the shared bus;
    wherein each IC of the plurality of ICs comprises:
        an input for receiving address data, said address data representing an address of the IC on the shared bus;
        an address register for storing the received address data as the address of the IC on the shared bus;
        output generator logic for modifying the received address data to produce modified address data that is different from the received address data, said modified address data representing an address of another IC on the shared bus; and
        an output for providing the modified address data;
    wherein the input of a first IC of the plurality of ICs communicates with the output of the controller, and the inputs of succeeding ICs communicate with the outputs of preceding ICs in a daisy chain configuration;
    wherein the first address data produced on the output of the controller represents an address of the first IC on the shared bus; and
    wherein the modified address data provided on the output of each IC of the plurality of ICs represents an address of a corresponding succeeding IC in the daisy chain configuration on the shared bus.

2. The electronic device claimed in claim 1, wherein the address data comprises a binary word.

3. The electronic device claimed in claim 1, wherein the address data comprises a series of pulses representing an address value.

4. The electronic device claimed in claim 1, further comprising a storage medium in communication with the controller and having stored therein programming instructions for instructing the controller to produce the first address data on the output thereof.

5. An electronic device, comprising:
    means for generating first address data at an output of a controller;
    means for receiving the first address data at an input of a first integrated circuit (IC);
    means for storing the first address data in the first IC as an address of the first IC;
    means for modifying the first address data in the first IC to produce first modified address data different from the first address data; and
    means for providing the first modified address data to a second IC through an output of the first IC, said first modified address data representing an address of the second IC.

6. A method for initializing addresses of a plurality of integrated circuits (ICs), comprising:
    generating first address data at an output of a controller;
    receiving the first address data at an input of a first IC;
    storing the first address data in an address register of the first IC as an address of the first IC;
    modifying the first address data in the first IC to produce first modified address data different from the first address data; and
    providing the first modified address data to a second IC through an output of the first IC, said first modified address data representing an address of the second IC.

7. The method for initializing claimed in claim 6, further comprising:
    receiving the first modified address data at an input of a second IC;
    storing the first modified address data in an address register of the second IC, as the address of the second IC;
    modifying the first modified address data in the second IC to produce second modified address data; and
    providing the second modified address data to a third IC through an output of the second IC, said second modified address data representing an address of the third IC.

8. An electronic device, comprising:
    a controller;
    a plurality of integrated circuits (ICs) addressable by the controller; and
    a shared bus joining the controller and the plurality of integrated circuits;
    wherein the controller is programmed to produce a series of addresses on the shared bus and to produce an enable signal on an output in conjunction with a first address of the series of addresses,
    wherein each IC of the plurality of ICs comprises;
        an input for receiving an input enable signal;
        an output for providing an output enable signal to another IC in conjunction with a change in address data on the shared bus;
        a shared bus input for receiving addresses present on the shared bus; and
        means for storing an address present on the shared bus as an address of the IC in response to receiving the input enable signal;
    wherein the input of a first IC of the plurality of ICs communicates with the output of the controller, and the inputs of succeeding ICs communicate with the outputs of preceding ICs in a daisy chain configuration;
    wherein the first address of the series of addresses produced by the controller on the shared bus represents an address of the first IC on the shared bus, and each succeeding address of the series of addresses produced by the controller on the shared bus represents an address of a corresponding succeeding IC in the daisy chain configuration; and
    wherein the enable signal produced on the output of the controller is received at the input of the first IC as the input enable signal for the first IC, and the output enable signal provided on the output of each IC of the plurality of ICs is received at the input of a corresponding succeeding IC in the daisy chain configuration as the input enable signal for the corresponding succeeding IC.

9. The electronic device claimed in claim 8, wherein each IC of said plurality of ICs further comprises a first logic circuit for storing the address present on the shared bus as the address of the IC upon receipt of the input enable signal.

10. The electronic device claimed in claim 9, wherein each IC of said plurality of ICs further comprises a second logic circuit for generating the output enable signal in conjunction with the change in address data on the shared bus.

11. The electronic device claimed in claim 10, wherein said second logic circuit of each IC of the plurality of ICs comprises a timer that is initialized upon receipt of the input enable signal, and that generates the output enable signal after a period of time that coincides with a rate of change of address data on the shared bus.

12. The electronic device claimed in claim 10, wherein said second logic circuit of each IC of the plurality of ICs produces the output enable signal upon detecting a first change in address data on the shared bus after receiving the input enable signal.

13. The electronic device claimed in claim 8, wherein each IC of said plurality of ICs comprises a processor programmed to initialize a timer upon receipt of the input enable signal, and to generate the output enable signal upon expiration of the timer.

14. The electronic device claimed in claim 8, wherein each IC of said plurality of ICs comprises a processor programmed to receive the input enable signal at the input, store the address data present on the shared bus as the address of the IC in response to the input enable signal, detect the change in the address data on the shared bus, and generate the output enable signal at the output in response to the change in the address data.

15. The electronic device claimed in claim 8, wherein each IC of said plurality of ICs comprises:
means for receiving the input enable signal at the input; and
means for generating the output enable signal at the output in conjunction with the change in the address data.

16. The electronic device claimed in claim 8, further comprising a storage medium in communication with the controller and having stored therein programming instructions for instructing the controller to produce the series of addresses on the shared bus and to produce the enable signal on the output in conjunction with the first address of the series of addresses.

17. An electronic device, comprising:
means for generating an enable signal at an output of a controller and generating first address data on a shared bus;
means for receiving the enable signal generated at the output of the controller at an input of a first integrated circuit (IC);
means for receiving the first address data at a shared bus input of the first IC;
means for storing the first address data in an address register of the first IC as an address of the first IC upon coincidence of receiving the enable signal and receiving the first address data; and
means for providing an output enable signal at an output of the first IC to an input of a second IC in conjunction with a change in address data on the shared bus.

18. A method for initializing addresses of a plurality of integrated circuits (ICs), comprising:
generating an enable signal at an output of a controller and generating first address data on a shared bus;
receiving the enable signal generated at the output of the controller at an input of a first IC;
receiving the first address data at a shared bus input of the first IC;
storing the first address data in an address register of the first IC as an address of the first IC upon coincidence of receiving the enable signal and receiving the first address data; and
providing a first output enable signal at an output of the first IC to an input of a second IC in conjunction with a change in address data on the shared bus.

19. A method as claimed in claim 18, further comprising:
generating second address data on the shared bus;
receiving the first output enable signal provided at the output of the first IC at the input of a second IC;
receiving the second address data at a shared bus input of the second IC;
storing the second address data present on the shared bus in an address register of the second IC as an address of the second IC upon coincidence the first output enable signal and receiving the second address data; and
providing a second output enable signal at an output of the second IC to an input of a third IC in conjunction with a change in address data present on the shared bus.

20. The method claimed in claim 18, wherein providing the first output enable signal at the output of the first IC comprises:
initializing a timer upon receipt of the enable signal at the input of the first IC, and generating the first output enable signal at the output of the first IC upon expiration of the timer.

21. The method claimed in claim 18, wherein the first output enable signal is generated at the output of the first IC upon detection of a change in address data after receiving the enable signal at the input of the first IC.

22. The electronic device claimed in claim 1, wherein the modified address data is incremented address data.

23. The electronic device claimed in claim 1, wherein the output generator logic modifies the address data by incrementing the address data.

24. The electronic device claimed in claim 5, wherein the means for modifying the first address data comprises a means for incrementing the first address data.

25. The method of claim 6, wherein the step of modifying the first address data in the first IC to produce first modified address data different from the first address data, comprises:
incrementing the first address data in the first IC to produce first modified address data different from the first address data.

26. The method of claim 7, wherein the step of modifying the first modified address data in the second IC to produce second modified address data, comprises:
incrementing the first modified address data in the second IC to produce second modified address data.

27. The electronic device of claim 8, wherein each address of the series of addresses produced by the controller on the shared bus is different.

28. The electronic device of claim 1,
wherein, after the first IC has stored the first address data in the address register of the first IC as the address of the first IC on the shared bus, the controller is configured to cause the first IC to execute an operation by sending a command to execute the operation over the shared bus, said command including the address of the first IC.

29. The electronic device of claim 8, wherein, after the first IC has stored the first address data in said means for storing an address of the first IC as the address of the first IC on the shared bus, the controller is configured to cause the first IC to execute an operation by sending a command to execute the operation over the shared bus, said command including the address of the first IC.

* * * * *